United States Patent
Watanabe et al.

[11] Patent Number: 5,869,132
[45] Date of Patent: Feb. 9, 1999

[54] PROCESS OF PREPARING FLUORINATED MATERIAL

[75] Inventors: Masahiro Watanabe, No. 2412-8, Wadamachi, Kofu-shi, Yamanashi; Noriaki Hara, Kanagawa, both of Japan

[73] Assignees: Tanaka Kikinzoku Kogyo K.K.; Masahiro Watanabe, both of Japan

[21] Appl. No.: 37,301

[22] Filed: Mar. 26, 1993

[51] Int. Cl.$^6$ ................................ B05D 7/00; B05D 5/12
[52] U.S. Cl. .......................... 427/215; 427/221; 427/115; 429/42
[58] Field of Search ...................... 427/215, 221, 427/115; 429/42

[56] References Cited

U.S. PATENT DOCUMENTS

| | | | |
|---|---|---|---|
| 4,877,694 | 10/1989 | Soloman et al. | 427/115 |
| 4,927,514 | 5/1990 | Soloman et al. | 429/42 |
| 5,137,754 | 8/1992 | Watanabe | 427/221 |

*Primary Examiner*—Shrive Beck
*Assistant Examiner*—David M. Maiorana
*Attorney, Agent, or Firm*—Klauber & Jackson

[57] ABSTRACT

Disclosed is a process of preparing fluorinated material which comprises thermally treating the mixture of carbon black and hydrocarbon polymer compound powder for covering the surface of the carbon black with the latter and fluorinating the hydrocarbon polymer compound. The thermal treatment can be conducted in two stages.

The fluorinated material prepared in accordance with the present invention can provide much more pore volumes acting as gas networks in, for example, an electrode which exhibits high gas permeability or gas supplying ability. Further, the hydrophobicity is as high as that of the material prepared in accordance with mixing carbon black with hydrocarbon polymer compound dispersed in an organic solvent, and is higher than that of the conventional mixture of carbon black and polytetrafluoroethylene particles. The fluorinated material is preferably employed to a fuel cell as gas network material.

5 Claims, No Drawings

PROCESS OF PREPARING FLUORINATED MATERIAL

BACKGROUND OF THE INVENTION

The present invention relates to a process of preparing fluorinated material preferably employed as raw material of a gas diffusion electrode of a fuel cell.

The gas diffusion electrode mainly employed in a fuel cell is an indispensable factor of effectively conducting a gas-liquid phase reaction. In the gas diffusion electrode in which fine channels of two types for a gas and an electrolyte are present, it is extremely difficult to achieve a long life and high performances in the existing structures of the fuel cell in which are used the conventional polytetrafluoroethylene (hereinafter referred to as "PTFE") for wet-proofing of gas channels because the gas channels are easily filled with an electrolyte in a short period due to the low wet-proofing property and become unable to supply a reactant gas to catalyst clusters existing in the electrolyte channels. By increasing the PTFE content, the hydrophobic property can be improved, but the utilization of catalyst clusters for the electrode reaction simultaneously decreases, resulting in the reduction of the electrode performance. Namely, the requirements of the gas and electrolyte channels to improve the respective properties contradict each other with the use of the conventional materials because their insufficient hydrophobic property.

In order to solve the above problem, one of the present inventors has proposed a process of preparing fluorinated particulate material employed in a fuel cell (U.S. Pat. No. 5,137,754). The process comprises applying a hydrocarbon polymer solution (for example, a hexane solution) to the surface of support material, vaporizing the solvent and fluorinating the polymer compound. The fluorinated material provided by this process, when employed in the fuel cell, forms a network through which a gas efficiently permeates.

In the network provided with material other than the above which is composed of carbon black of which a particle size is usually about 0.02 and 0.06 $\mu$m and PTFE, particles of which a particle size is usually about 0.3 $\mu$m, the carbon black surface is not completely covered with PTFE. The space in the agglomerated carbon black or that between the carbon black and PTFE may act as a gas network at the initial stage of operation, but the space will be filled with an electrolyte sooner or later resulting in the degradation of cell performances.

Since, to the contrary, a thin layer is formed around the material provided by the process of the U.S. patent, the fuel cell employing the material exhibits high performances because the space is not likely to be filled with the electrolyte.

However, the material particles before the fluorination of the U.S. patent are likely to agglomerate with each other to become massive so as to provide the thin layer of which a thickness is not uniform so that time complete fluorination can be achieved only under strict conditions. Since, further, the material becomes massive, the space or fine apertures of the materials is likely to be filled with the hydrocarbon polymer to lessen the number of channels for gas supply and discharge. In addition, the preparation of the solution of the hydrocarbon polymer itself is dangerous and rather complex.

SUMMARY OF THE INVENTION

All object of the present invention is to provide a process of preparing fluorinated material having high hydrophobicity and high gas supplying ability.

Another object of the invention is to provide a process of preparing the fluorinated material capable of easily forming a thin hydrocarbon polymer layer around carbon support.

A further object of the invention is to provide a process of preparing the fluorinated material having the thin layer of uniform thickness.

The present invention has been made to overcome the above-mentioned drawbacks of the prior art. The objects can be attained by a process of the present invention which comprises thermally treating the mixture of carbon black and hydrocarbon polymer compound powder for covering the surface of the carbon black with the latter and fluorinating the hydrocarbon polymer compound.

Contrary to the conventional method of applying a solution, the method of directly forming the thin layer of such a hydrocarbon polymer as polyethylene on the carbon black in accordance with the present invention enables the formation of the thin layer having a more uniform thickness which further enables the successive complete fluorination under milder conditions.

The fluorinated material prepared in accordance with the process of this invention can provide much more pore volumes acting as gas networks in, for example, an electrode which exhibits high gas permeability or gas supplying ability. Further, the hydrophobicity is as high as that of the conventional one.

The fluorinated material is preferably employed as raw material of a fuel cell.

DETAILED DESCRIPTION OF THE INVENTION

The hydrocarbons employed in the present invention include low molecular weight aliphatic hydrocarbons such as ethylene, propylene and butylene. The hydrocarbon polymer can be produced from the said hydrocarbons through polymerization thereof. The said polymer powder which is either a homopolymer or a copolymer thereof may have a mean particle diameter of 30 to 2100 $\mu$m, preferably 50 to 150 $\mu$m, more preferably 70 to 100 $\mu$m, and have a molecular weight of 50,000 to 1,000,000, preferably 100,000 to 500,000, more preferably 150,000 to 400,000. The polyethylene having the average particle size of 70 to 100 $\mu$m and the molecular weight of around 250,000 are most preferable.

The said hydrocarbon polymer may be as fine as possible to form the uniform thin layer.

On the other hand, the mean primary particle size of the carbon black is preferably between 0.03 and 0.05 $\mu$m.

The polymer powder may be mixed with the carbon black all at once, or the former may be divided into several portions which are then separately added to the latter.

The thermal treatment of the above powdery polymer is (carried out for supporting the powdery polymer onto the carbon black and for forming and fixing the uniform thin layer thereon. Accordingly, for attaining the purposes more smoothly, the thermal treatment may be carried out in two stages, one at a relatively low temperature (preferably at 130° C. to 190° C.) supporting stage, during which the polymer becomes supported on the carbon black, and the other at a relatively higher temperature (preferably between 200° C. to 250° C.), a film forming and fixing stage, during which the polymer forms a film on the carbon black.

The thermal treatment is more preferably carried out in fluidized conditions such as in a rotary kiln for elevating the performances of the resulting material rather than in a fixed bed.

The formation of the thin layer, that is, the thermal treatment in an inert gas may be performed in one procedure or in successive several procedures.

The average thickness of the thin layer formed around the above carbon black ranges preferably from 50 Å to 500 Å.

EXAMPLES

Preferred Examples of this invention will be hereinafter described. However, the Examples are not intended to limit the present invention.

Examples 1

30 g of carbon black (about two liters, Denka Black of Denki Kagaku Kogyo) was weighed and crushed by means of a juicer, and 8.4 g of powdery polyethylene (Ili-Zex 7000 MP of Mitsui Sekiyu Kagaku Kogyo: mean particle size was 70 to 100 $\mu$m: molecular weight was weighted. After the two components were mixed by means of a mixer, the mixture was transferred to a rotary kiln in which it was thermally treated under nitrogen atmosphere at 190° C. for one hour and then at 210° C. for five hours successively to obtain the carbon black coated with the polyethylene thin layer. After the carbon black was put in a reactor made of stainless steel, a fluorine gas, diluted to 10% with nitrogen twice a stoichiometric amount was introduced into the reactor for 30 minutes to fluorinate the polyethylene to obtain the final fluorinated material. The ratio of the fluorinated polyethylene to the carbon black was 1.1.

Example 2

The fluorinated material was prepared in accordance with the procedures of Example 1 except that the mixing of 1.68 g of the polyethylene and the carbon black followed by the thermal treatment at 190° C. for one hour was repeated five times and the thermal treatment at 210° C. was conducted for five hours.

Example 3

The fluorinated material was prepared in accordance with the procedures of Example 1 except that 16.8 g of the powdery polyethylene was employed. The ratio of the fluorinated polyethylene to the carbon black was 2:1.

Example 4

The fluorinated material was prepared in accordance with the procedures of Example 2 except that the mixing of 1.68 g of the polyethylene and the carbon black was repeated 10 times in place of the mixing of 0.84 g.

Example 5

The fluorinated material was prepared in accordance with the procedures of Example 3 except that a fixed bad was employed in place of the rotary kiln at thermal treatment.

Comparative Example 1

The fluorinated material was prepared in accordance with the procedures of Example 1 except that 328.5 g of a 2%-dispersed solution of polyethylene was applied on the carbon black followed by drying in place of the mixing with the powdery polyethylene. The dispersed solution was prepared by impregnating 2 g of the powdery polyethylene with 98.0 g of hexane, and dispersing the polyethylene in the hexane in an autoclave at 300° C. and 300 atm. for 5 hours.

Example 6

The fluorinated material was prepared in accordance with the procedures of Example 1 except that the thermal treatment was conducted at 210° C. for six hours.

Comparative Example 2

The fluorinated material was prepared in accordance with the procedures of Comparative Example 1 except that the application of 65.7 g of a 2% dispersed solution of polyethylene and the following thermal treatment were repeated five times and the resulting material was further thermally treated at 210° C. for 5 hours.

① Particle Size Distribution

Table 1 shows particle size distribution of the seven fluorinated materials obtained through Examples and Comparative Examples. The numerals shown in Table 1 obtained my measuring the particle size distribution of the respective samples by means of a razor diffraction method are the respective peak intensities of agglomerated particles and of aggregated particles in the particle size distribution diagrams, which indicate the degree of agglomeration of the particles of the seven samples. When the peak intensities of the agglomerated particles decreased, that of the aggregated particles simultaneously increased. It can be seen that the agglomeration of the respective particles was more depressed in the Examples than in the Comparative Examples, and that in particular the agglomeration of the Examples 3 to 5 in which the amount of the polyethylene was twice did not remarkably proceed as to the Comparative Examples.

TABLE 1

| Sample | Ex. 1 | Ex. 2 | Ex. 3 | Ex. 4 | Ex. 5 | Ex. 6 | Com. Ex. 1 | Com. Ex. 2 |
| --- | --- | --- | --- | --- | --- | --- | --- | --- |
| Aggregate % | 2.2 | 3.0 | 3.1 | 2.3 | 4.8 | 3.9 | 0.5 | 1.8 |
| Agglomerate % | 5.8 | 5.5 | 8.8 | 10.3 | 5.5 | 5.6 | 15.2 | 13.6 |

TABLE 2

| Sample | Ex. 1 | Ex. 2 | Ex. 3 | Ex. 4 | Ex. 5 | Ex. 6 | Com. Ex. 1 | Com. Ex. 2 |
| --- | --- | --- | --- | --- | --- | --- | --- | --- |
| Pore Volume (cc/g) | 3.5 | 3.8 | 4.0 | 4.9 | 3.2 | 3.3 | 2.2 | 2.5 |

② Pore Distribution

Table 2 shows the measurement of pore volumes (per g carbon) of the respective samples. The pore volume of carbon black itself was 2.7 cc/g. It can be seen from the Table that the pore volumes of the Examples were larger than that of the carbon black while those of the Comparative Examples were smaller than that of the carbon black. Judging from this fact, the pore volume effective for gas diffusion can be made larger when the fluorinated material is made in accordance with the Examples.

③ Conversion of Fluorination

Table 3 shows the conversion of fluorination when the particles were fluorinated under the same condition. A fluorine gas twice the stoichiometric amount was diluted with an inert gas and employed.

The conversion of the Examples was elevated compared with that of the Comparative Examples. Even the Examples 3 to 5 a polyethylene amount of which was twice exhibited the conversion of fluorination the same as or larger than that of the Comparative Examples showing that the process of covering the polyethylene of the Examples largely influenced the subsequent fluorination.

TABLE 3

|  | Ex. 1 | Ex. 2 | Ex. 3 | Ex. 4 | Ex. 5 | Ex. 6 | Com. Ex. 1 | Com. Ex. 2 |
| --- | --- | --- | --- | --- | --- | --- | --- | --- |
| F Conversion (%) | 100 | 100 | 93 | 95 | 90 | 95 | 90 | 85 |

④ Electrode Characteristics

Table 4 shows the results of experiments carried out by utilizing electrodes #1 to 7 formed by the fluorinated material of the Examples 1 to 5 and the Comparative Examples 1 and 2 which was used as a gas channel substrate and another electrode #1 consisting of only a conventionally employed catalyst and PTFE (carbon black:PTFE=1.1). The platinum loading of the respective electrodes was adjusted to 1 mg per 1 $cm^3$ electrode.

The electrodes of the Examples exhibit smaller Tafel slopes, larger mass activities and higher cathode potential than those of the Comparative Examples and the conventional electrode. The utilization ratio of catalyst clusters of the Examples are elevated which is characteristic of the function-separated type structure. Since, further, the pore occupation of the electrolyte was smell while the high catalyst utilization ratio was maintained, the gas channels could be firmly retained.

TABLE 4

| Electrode | Sample | Tafel Slope (AIR, −mV/ log(mA/ $cm^2$)) | Mass Activity ($O_2$ @ 900 mA/mgPt) | Cathode Potential (AIR, @ 300 mA/ $cm^2$ mV vs RHE) | Pt-Loading $mg/cm^3$ | Catalyst Utilization Rate % | Pore Occupation with $H_3PO_4$ % |
| --- | --- | --- | --- | --- | --- | --- | --- |
| #1 | Ex. 1 | 92 | 68 | 763 | 1.0 | 95 | 60 |
| #2 | Ex. 2 | 90 | 69 | 765 | 1.0 | 93 | 55 |
| #3 | Ex. 3 | 92 | 68 | 764 | 1.0 | 95 | 60 |
| #4 | Ex. 4 | 88 | 70 | 770 | 1.0 | 97 | 55 |
| #5 | Ex. 5 | 93 | 67 | 763 | 1.0 | 93 | 60 |
| #6 | Ex. 6 | 92 | 65 | 762 | 1.0 | 93 | 60 |
| #7 | Com. Ex. 1 | 97 | 63 | 760 | 1.0 | 90 | 60 |
| #8 | Com. Ex. 2 | 95 | 65 | 753 | 1.0 | 92 | 60 |
| #9 | * | 103 | 57 | 750 | 1.0 | 70 | 70 |

*: Conventional Electrode

What is claimed is:

1. A process of preparing fluorinated material which comprises the steps of: mixing carbon black with hydrocarbon polymer compound powder; thermally treating the mixture of carbon black and hydrocarbon polymer compound powder (for covering) whereby the surface of the carbon black is covered with the (latter) hydrocarbon polymer compound; and thereafter fluorinating the hydrocarbon polymer compound.

2. A process of preparing fluorinated material in accordance with claim 1, wherein at least one of the thermal treatment for covering the carbon black with the hydrocarbon compound and the (fluorination stages) fluorinating of the hydrocarbon polymer, is carried out while the carbon black is in a fluidized condition.

3. A process of preparing fluorinated material in accordance with claim 1, wherein the thermal treatment of the mixture of the carbon black and the hydrocarbon polymer compound powder is conducted in two stages, (one of which is a first supporting one at) with a first stage at a relatively low temperature below 190° C., to effect support of the hydrocarbon polymer compound on said carbon black, and the other stage at a relatively high temperature, above 200° C. to provide a thin layer of the hydrocarbon polymer compound on said carbon black.

4. A process of preparing fluorinated material in accordance with claim 1 wherein the hydrocarbon polymer compound powder is divided into two or more portions which are then separately added to the carbon black.

5. An electrode which contains the fluorinated material which has been prepared by the steps of: mixing carbon black with a hydrocarbon polymer compound powder; thermally treating the resulting mixture of carbon black and hydrocarbon polymer compound powder whereby the surface of the carbon black is covered with the hydrocarbon polymer compound; and thereafter fluorinating the hydrocarbon polymer compound.

* * * * *